S. E. BAILEY.
TRAP.
APPLICATION FILED FEB. 20, 1919
1,366,049.
Patented Jan. 18, 1921.
2 SHEETS—SHEET 1.
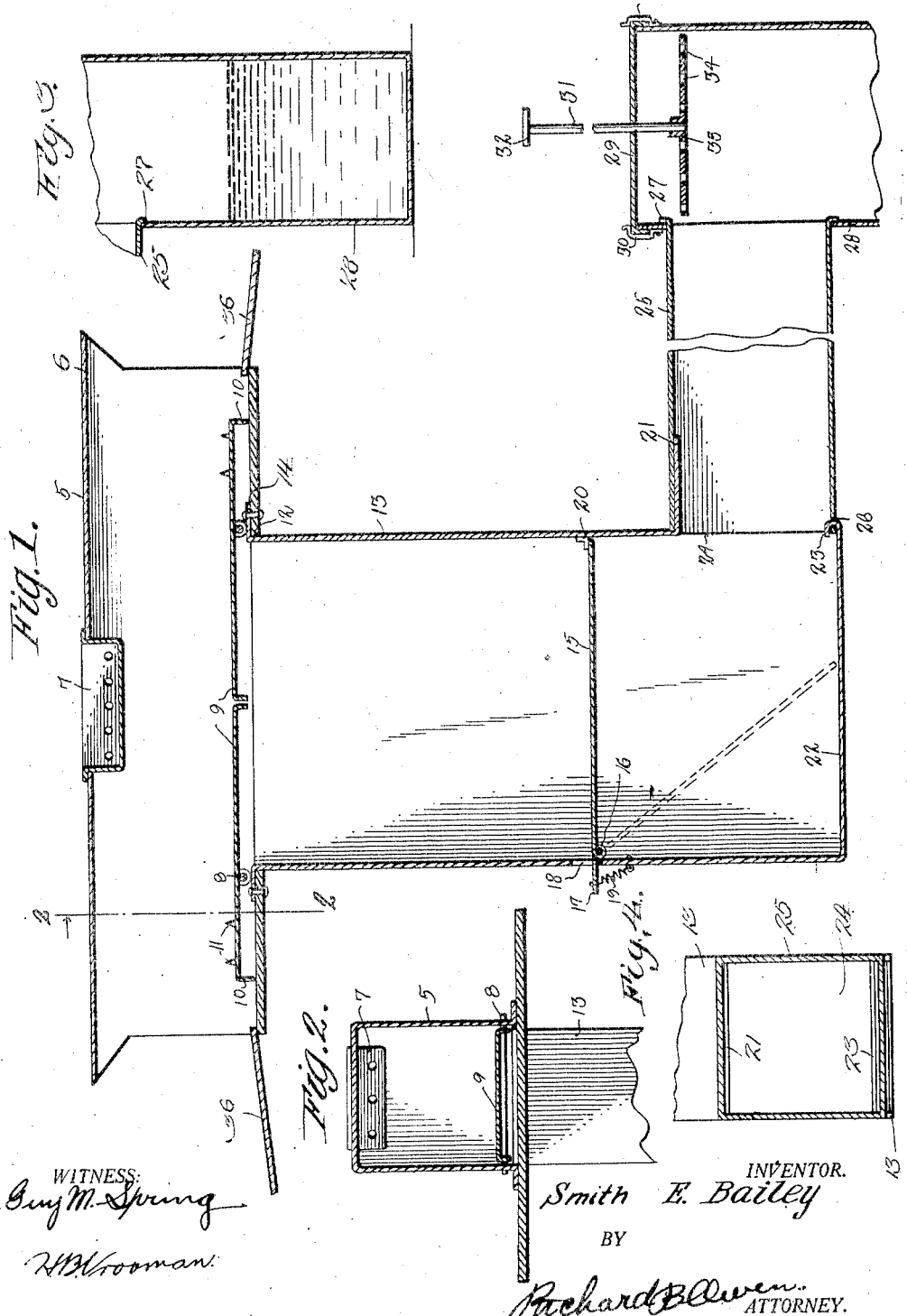
WITNESS:
Guy M. Spring
H. B. Vrooman
INVENTOR.
Smith E. Bailey
BY
Richard B. Owen
ATTORNEY.

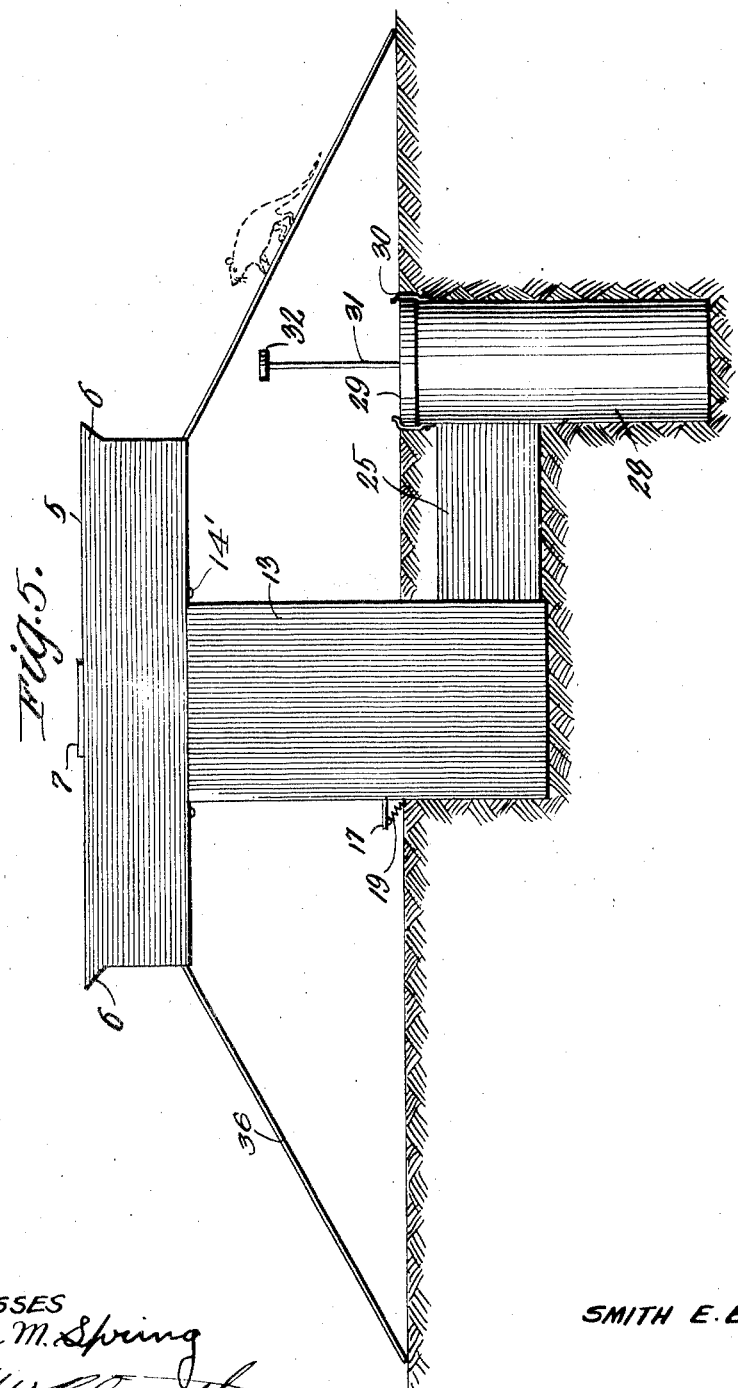

UNITED STATES PATENT OFFICE.

SMITH E. BAILEY, OF HUNTER, KANSAS.

TRAP.

1,366,049.

Specification of Letters Patent.

Patented Jan. 18, 1921.

Application filed February 20, 1919. Serial No. 278,117.

*To all whom it may concern:*

Be it known that I, SMITH E. BAILEY, a citizen of the United States, residing at Hunter, in the county of Mitchell and State of Kansas, have invented certain new and useful Improvements in Traps, of which the following is a specification.

This invention relates in general to traps and has particular reference to a rat or mouse trap.

One object of this invention is the production of a rat trap wherein a plurality of tubes are connected to each other for directing the rat into the interior of the trap where he may finally be passed into a receptacle and submerged in water to be drowned.

Another object of this invention is the production of a rat trap which is so arranged as to allow a number of rats or rodents to pass thereinto without danger of escaping from the same after passing onto the platforms in the entrance sleeve.

One practical form of construction and assembly of the present invention will be hereinafter described and is illustrated in the drawings, in which:—

Figure 1 is a fragmentary sectional view through the trap.

Fig. 2 is a fragmentary sectional view taken on the line 2—2 of Fig. 1.

Fig. 3 is a fragmentary vertical section through the lower end of a certain receptacle used in the present device.

Fig. 4 is a section taken on the line 4—4 of Fig. 1.

Fig. 5 is a side elevation of the invention ready for use.

In the preferred embodiment of the present invention about to be described, 5 indicates the entrance sleeve which is elongated and has projections 6 at its upper end portions whereby a bag or cloth may be thrown over the trap without entirely closing the entrance sleeve 5. The ends of the sleeve may be provided with a runway directing a rodent thereinto or the device may be set down into a hollow with proper protection for the bait pan. This runway above referred to may be in the form of slanting boards 36 having their upper ends placed in engagement with the base of the entrance sleeve as illustrated in Fig. 5. A bait pan 7 is carried by the central upper portion of the entrance sleeve 5, thus causing the rodent to be enticed into the interior portion of the sleeve 5. This sleeve has supporting pins 8 upon which the platforms 9 are pivotally mounted. The rear portions of the platforms are flanged as indicated at 10 and provided with spurs 11 which counter-balance the effect of the length of the opposite ends of the platform and normally retain the same in horizontal position. The lower portion of the casing 5 is provided with an opening 12 therein as shown in Fig. 1.

The vertically extending casing 13 has a flange 14 engaging the inner surface of the bottom of the sleeve 5 and secured thereto by fastening elements 14' such as rivets, since this casing 13 extends through the opening 12 and communicates with the interior of the sleeve 5. An enlarged platform 15 is pivotally mounted upon the pin 16 intermediate the ends of the vertical casing 13. A projection 17 extends from one end of the platform 15 and extends through the slot 18 in the casing 13. The coil spring 19 has its ends connected to the casing and to the projection 17 thus normally urging the platform 15 in one direction although the bracket 20 carried within the casing will normally limit the movement of the platform 15 in one direction. One wall of the casing 13 is provided with an outwardly bent shelf portion 21 while the bottom 22 of the casing 13 has a hook 23 formed thereon adjacent the exit opening indicated at 24.

A conduit 25 has a slot 26 adjacent one end and provides that the conduit may be hooked over the hook 23 of the casing 13 and then be swung to engage the shelf portion 21 to form a tight closure at this opening 24 of the casing 13. The opposite end of the conduit 25 is provided with flanges 27, it being obvious that the conduit may be of any desired length.

By referring to Figs. 1 and 4 it will be noted that the conduit 25 is rectangular in cross section and is adapted to first receive the hook 23 at one end thereof and the forward end is swung upwardly to move the rear end of the conduit over the shelf 21. In order to allow this arc of movement of the rear end of the conduit, it is obvious the shelf 21 may be sprung slightly downwardly at its outer end, owing to the fact that it is formed of sheet metal and as the conduit 25 finally assumes the position as shown in Fig. 1, the shelf will again extend horizontally thus firmly although detachably holding the conduit in connection with the casing 13.

The receptacle 28 which should be comparatively deep fits over the end of the conduit 25, the flanges 27 holding the receptacle in engagement with the conduit. This receptacle is provided with a cover 29 releasably held upon the receptacle by the clips 30. A central stem 31 is carried by the cover 29 and has a grip 32 at its outer end. The inner end of the stem 31 has a plate 33 fixed thereon, this plate being provided with apertures 34 and being of substantially the same dimensions as the receptacle 28 for the purpose to be hereinafter set forth.

When the device is used it will assume the position shown in Fig. 5 at which time bait may be placed in the pan 7. The rodents will pass into the sleeve 5 to a point adjacent the pan and obviously after they pass the pivotal support of the platforms 9 the platforms will swing downwardly at their inner ends, thus causing the rodents to be thrown down into the casing 13. The rodents will then land on the platform 15 which will swing down as indicated in dotted lines in Fig. 1 the angle of the platform 15 tending to direct the rodents toward the opening 24 of the casing 13. The rodents therefore will pass through the conduit 25 into the receptacle 28 in which a quantity of water may be carried. The operation may continue as long as the rodents pass into the trap. When so desired a person may grasp the grip 32 and press the stem 31 inwardly, thus causing the plate to pass downwardly toward the lower portion of the receptacle 28. The apertures in the plate 33 will permit the water to pass through the openings although the plate fits snugly within the receptacle and will prevent the escaping of rats around the side edges thereof. Accordingly the rodents will be driven downwardly and submerged under the water where they may be held until they are drowned. At this time the clips 30 may be released from their engagement with the cover 29, thus permitting the cover as well as the stem and the plate to be lifted from the receptacle and at this time the rodents may be removed from the receptacle and the water emptied therefrom and a fresh quantity of water placed therein.

From the foregoing description it will be noted that a rodent trap is provided in which the parts are comparatively simple and thus minimize the danger of accidental injury of any of the parts when the device is in operation. Further the simplicity of the structure permits of comparatively cheap manufacture, while the arrangement of the platforms is such as to allow the rodent to be directed down into the conduit and then into the receptacle. After the rats have been passed into the receptacle they may be submerged and drowned as specified.

The foregoing description and accompanying drawings have reference to what might be considered to be the approved or preferred form of my invention. I desire it to be understood that I may make such changes in the construction, combination and arrangements of parts, materials, dimensions, et cetera, as may prove expedient and fall within the scope of the appended claim.

Having thus fully described my invention what I claim as new and desire to secure by Letters Patent, is:—

In a trap of the class described, a casing having an opening therein, said casing having a hook adjacent one edge of the opening, said casing also having a shelf portion adjacent the opposite edge of the opening, a conduit pivotally connected at one end to the hook and engaging the shelf portion for forming a closure for the casing, and a receptacle carried by the opposite end of said conduit.

In testimony whereof I affix my signature in presence of two witnesses.

SMITH E. BAILEY.

Witnesses:
 C. R. HUBBARD,
 ZELLA VAN LEEWEN.